No. 863,308. PATENTED AUG. 13, 1907.
A. S. NEWTON.
WASTE TRAP.
APPLICATION FILED JAN. 29, 1907.

WITNESSES.
A.G. Pieczentkowski.
Walter E. Goodwin.

INVENTOR
Albert S. Newton
Horatio E. Bellows
BY.
ATTORNEY

UNITED STATES PATENT OFFICE.

ALBERT S. NEWTON, OF PROVIDENCE, RHODE ISLAND.

WASTE-TRAP.

No. 863,308.   Specification of Letters Patent.   Patented Aug. 13, 1907.

Application filed January 29, 1907. Serial No. 354,701.

*To all whom it may concern:*

Be it known that I, ALBERT S. NEWTON, a citizen of the United States, residing at Providence, in the county of Providence and State of Rhode Island, have invented certain new and useful Improvements in Waste-Traps, of which the following is a specification, reference being had therein to the accompanying drawing.

My invention relates to all kinds of traps and has for its essential objects the facile detection of leaks; a protection against the breaking of the trap seal when leaks do occur; facility in restoring the seal; and a more perfect baffling action.

A further object is to produce a trap which shall be vertically adjustable, particularly when a horizontal or curved outlet pipe is employed.

To the above several ends primarily my invention consists in constructing the trap body with an internal cylindrical elevation in its base which engages the waste pipe intermediate its length.

It consists also in introducing an internal annular deflection plate within the trap body below the guard or baffle plate, guiding the water against the latter, which throws the water down to assist the seal and prevents a complete vacuum.

Invention further consists in introducing the horizontal waste pipe into a removable intermediate portion of the trap body, which portion is connected by threads with the remainder of the trap body.

Figure 1:
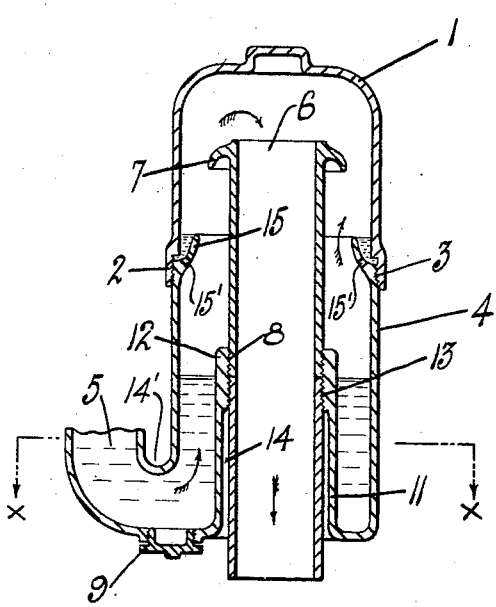
Figure 2:
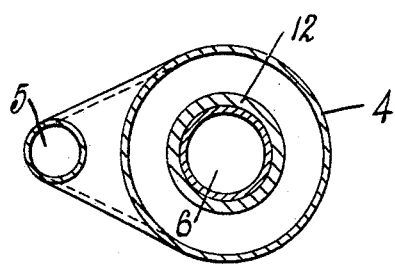

In the drawings which constitute a part of these specifications, Figure 1 is a central vertical section of a trap embodying my invention. Fig. 2, a transverse section of the same on line *x x* of Fig. 1.

Like reference characters indicate like parts throughout the views.

The preferred and illustrated embodiment of my invention comprises the cap, 1, provided with threads, 2, upon its lower inner margin adapted to engage threads, 3, upon the outer upper margin of the trap body, 4.

5 is the inlet, and 6 the vertical outlet pipe or duct. The latter has upon or near its upper end a collar or guard plate, 7, and upon its exterior screw threads, 8.

9 is the drain cap screwed into the bottom of the trap. Projecting upwardly from the base of the trap body and concentric therewith is a cylindrical projection or wall, 11, having upon the interior of its upper end an annular inwardly directed shoulder, 12, whose face is provided with screw threads 13, adapted to engage the threads, 8, upon the outlet pipe. Thereby is created an annular space or clearance, 14, around the pipe, 6, and intermediate the latter and the cylinder, 11.

Extending inwardly from the inner upper margin of the trap body is an inwardly inclined deflecting plate, 15, having one or more perforations, 15', near its base, which not only serves as a local water seal but extends inwardly to such a distance as to be in approximately the vertical plane with the plate, 7, and below the same.

The course of the water in the trap is indicated by the arrows. That is, the water entering the induct, 5, strikes the deflecting plate, 15, and a portion thereof is impeded and thrown downward by the baffle plate, 7, the main body of the water passes over the top of the educt pipe, 6.

It will be seen that any leak which from corrosion or otherwise occurs in the pipe, 6, or the cylinder, 11, at a point below the cylinder shoulder, 12, will trickle down through the space, 14, and give notice of the leak. If the leak occurs in the pipe, 6, above the shoulder, 12, the leaking water would merely escape through waste pipe itself; but there would be no danger of the water level in the trap reaching such a low point as to break the trap seal, as it would if the water approximated the level of the induct throat, 14', because the protecting cylinder, 11, rises to a point considerably higher than the plane of the throat. In actual practice, I find a desirable height for the cylinder shoulder to be about two or three inches above the horizontal plane of the top of the throat, 14'.

The normal water level of the trap is above the plate, 15, and seals the joint at the upper end of the body. When the seal is broken water still remains within the plate. But through perforations, 15', this water descends and assists resealing the trap. This feature is of especial utility in testing the trap.

What I claim is,

1. In a waste-trap the combination with the body, induct pipe, and educt pipe, of a cylindrical wall in the base of the body and extending within the body, and an inwardly directed shoulder upon the cylindrical wall in which shoulder the educt pipe is mounted.

2. In a waste-trap the combination with the trap body and induct pipe, of an inwardly directed inclosing wall upon the base of the body, and an educt pipe mounted within the wall to form a space intermediate the wall and educt pipe.

3. In a waste-trap the combination with a body, of an induct pipe having a throat and leading to the lower part of the body, a vertical inclosing wall in the base of the body, a shoulder upon the vertical wall not lower than the horizontal plane of the top of the throat, and an educt pipe fixed in the shoulder concentric with the vertical wall.

4. In a waste-trap, the combination with the body and induct pipe, of an educt pipe mounted in the body and an inclosing wall surrounding said educt pipe forming a space intermediate the said wall and educt pipe, an annular baffle plate upon the upper portion of the educt pipe and an annular deflecting plate upon the body provided with openings for the drainage of the water from the seal formed by said plate.

5. In a waste-trap the combination with the body provided with threads upon its outer upper margin, of a cap provided with threads upon its lower inner margin, an induct pipe in the lower portion of the body, an educt pipe mounted in the body, a wall rising from the body and surrounding the lower end of the educt pipe and forming a space intermediate said wall and educt pipe an annular baffle plate upon the upper portion of the induct pipe, and an upwardly inclined deflecting plate upon the inner margin of the body below the baffle plate and having perforations for the discharge of the water from the seal formed by said deflecting plate.

In testimony whereof I have affixed my signature in presence of two witnesses.

ALBERT S. NEWTON.

Witnesses:
HORATIO E. BELLOWS,
WALTER E. GOODWIN.